Patented Oct. 16, 1951

2,571,896

UNITED STATES PATENT OFFICE 2,571,896

RECOVERY OF RIBOFLAVIN

John C. Keresztesy, Westfield, and Edward L. Rickes, Rahway, N. J., assignors to Merck & Co., Inc., Rahway, N. J., a corporation of New Jersey No Drawing. Application October 31, 1945, Serial No. 625,942

4 Claims. (Cl. 260—211.3)

This invention relates generally to improvements in methods of obtaining vitamins and, more particularly, it is concerned with a novel process for extracting vitamins from vitamin-containing materials.

Previously, in obtaining vitamins, particularly in obtaining riboflavin and other water-soluble vitamins from fermentation residues and from fermented mashes or "beers," it has been customary to extract the vitamin material with an aqueous solvent, absorb the vitamin on fuller's earth from acid solution or on frankonite from neutral solution, elute with a basic solution or compound, and extract the vitamin from the eluate. This procedure is costly and unsatisfactory in that it requires considerable time and handling by skilled labor. The direct extraction of natural materials, especially those of plant origin, by means of aqueous acid, water-ethanol, or ethyl alcohol alone, yields only a part of their total vitamin content. Moreover, that part secured is contaminated with difficultly-separable impurities which make it necessary to employ the tedious adsorption and elution described.

We have now found that it is possible to secure riboflavin directly from natural materials, especially those of microbiological origin such as fermentation mashes or beers, without the necessity of adsorbing and eluting. The yields secured by our improved procedure are sufficiently high for industrial purposes, and the time necessary for the process, as well as the labor costs, is considerably reduced.

In accordance with our process a fermentation mash, or a beer such as Eremothecium ashbyii beer, is treated by a procedure which permits recovery of the riboflavin by crystallizing it out from a vitamin-containing liquor. In carrying out this process an organic solvent such as acetone should first be added to the fermented mash in order to precipitate out undesirable impurities. Concentration of the decanted liquor, followed by the addition of further amounts of the organic solvent, will permit obtaining the riboflavin in crystalline form merely by maintaining the liquor at a low temperature for the period of time necessary to permit crystallization.

This general process may be illustrated by the following example in which riboflavin is recovered from a fermented mash which may be an Eremothecium ashbyii beer.

Example 4400 cubic centimeters of a filtrate containing 0.880 gram of riboflavin secured from a fermented mash (Eremothecium ashbyii beer) was concentrated under reduced atmospheric pressure to a volume of 575 cubic centimeters. While still hot, this syrupy concentrate was treated by the addition of 10 volumes of boiling acetone. It was then chilled for two hours, at the end of which time the supernatant liquor was decanted from the gummy residues. This liquor was then concentrated, under reduced pressure, to a volume of 80 cubic centimeters. Hot acetone in the amount of 80 cubic centimeters was then added to the concentrated liquor, and the mixture allowed to stand for 5 days in a refrigerator. At the end of 5 days the crystalline riboflavin was filtered off from the cold liquor and dried.

The recovery of riboflavin in crystalline form was 0.4909 gram, the yield being approximately 56%.

The above description and example are intended to be illustrative only. Any modification of, or variation therefrom, which conforms to the spirit of the invention, is intended to be included within the scope of the appended claims.

We claim:

1. The process of recovering riboflavin directly from an untreated Eremothecium ashbyii beer containing riboflavin which comprises concentrating said beer, adding a lower aliphatic ketone thereto to precipitate undesirable impurities naturally present in said beer, and permitting the resulting concentrated liquor to stand at a low temperature in order that riboflavin in crystalline form may crystallize out therefrom.

2. The process of recovering riboflavin directly from an untreated Eremothecium ashbyii beer containing riboflavin which comprises concentrating said beer, adding a lower aliphatic ketone thereto to precipitate undesirable impurities naturally present in said beer, recovering the supernatant clear liquor, concentrating said supernatant clear liquor under reduced pressure, adding a further amount of said ketone thereto, and permitting the resulting mixture of concentrated liquor and organic solvent to stand at a low temperature whereby riboflavin in crystalline form crystallizes out therefrom.

3. The process of recovering riboflavin directly from an untreated Eremothecium ashbyii beer containing riboflavin which comprises concentrating said beer to smaller volume, adding acetone thereto in order to precipitate undesirable impurities naturally present in said beer, concentrating the resulting liquor, and then permitting said concentrated liquor to stand at a low temperature in order that riboflavin in crystalline form may crystallize out therefrom.

4. The process of recovering riboflavin directly from an untreated *Eremothecium ashbyii* beer containing riboflavin which comprises concentrating said beer to smaller volume, adding acetone thereto in order to precipitate undesirable impurities naturally present in said beer, removing the resulting purified liquor from said impurities, concentrating said liquor further, adding a substantially equal volume of acetone thereto, and then permitting said liquor to stand at a low temperature until crystalline riboflavin has crystallized out therefrom.

JOHN C. KERESZTESY.
EDWARD L. RICKES.

REFERENCES CITED

The following references are of record in the file of this patent:

UNITED STATES PATENTS

| Number | Name | Date |
|---|---|---|
| 2,355,220 | Keresztesy et al. | Aug. 8, 1944 |

OTHER REFERENCES

Greene et al., J. A. C. S., vol. 59 (1935), pages 1820 to 1823, inclusive.

Journal American Chem. Soc., 1937, vol. 59, page 1822.